United States Patent
Rhein et al.

(10) Patent No.: US 10,573,938 B2
(45) Date of Patent: Feb. 25, 2020

(54) BATTERY MODULE WITH A TEMPERATURE MONITORING ASSEMBLY

(71) Applicants: TYCO ELECTRONICS CORPORATION, Berwyn, PA (US); TE Connectivity Germany GmbH, Bensheim (DE)

(72) Inventors: David James Rhein, Memphis, MI (US); Andre Dressel, Lampertheim (DE)

(73) Assignees: TE Connectivity Corporation, Berwyn, PA (US); TE Connectivity Germany GMBH, Bensheim (DE)

( * ) Notice: Subject to any disclaimer, the term of this patent is extended or adjusted under 35 U.S.C. 154(b) by 266 days.

(21) Appl. No.: 15/157,771

(22) Filed: May 18, 2016

(65) Prior Publication Data

US 2016/0380319 A1    Dec. 29, 2016

Related U.S. Application Data

(60) Provisional application No. 62/184,636, filed on Jun. 25, 2015.

(51) Int. Cl.
*H01M 10/48* (2006.01)
*H01M 2/04* (2006.01)
(Continued)

(52) U.S. Cl.
CPC ......... *H01M 10/486* (2013.01); *H01M 2/043* (2013.01); *H01M 2/1077* (2013.01);
(Continued)

(58) Field of Classification Search
None
See application file for complete search history.

(56) References Cited

U.S. PATENT DOCUMENTS

| 2013/0143085 | A1 | 6/2013 | Yoon | |
| 2016/0035467 | A1* | 2/2016 | Haydin | H01C 1/02 |
| | | | | 429/90 |
| 2017/0271642 | A1* | 9/2017 | Groshert | H01M 2/202 |

FOREIGN PATENT DOCUMENTS

| DE | 198 10 746 A1 | 9/1999 | |
| DE | 10 2012 205019 A1 | 10/2013 | |
| DE | 102014003090 A1 * | 9/2015 | ............ B60L 3/0046 |

OTHER PUBLICATIONS

English Translation of DE-102014003090-A1 (Year: 2014).*
International Search Report, International Application No. PCT/US2016/033860, International Filing date, May 24, 2016.

* cited by examiner

*Primary Examiner* — Lucas J. O'Donnell

(57) ABSTRACT

A battery module includes a plurality of battery cells and a cover assembly coupled to the battery cells. The battery cells are arranged in a stacked configuration. The cover assembly includes a housing, bus bars, and a temperature monitoring assembly. The bus bars engage corresponding positive and negative cell terminals of the battery cells to electrically connect adjacent battery cells. The temperature monitoring assembly is mounted to and extends along a mounting surface of the cover assembly that faces the battery cells. The temperature monitoring assembly includes an electrical cable, a temperature sensing device mounted to and electrically connected to the electrical cable, and a thermally conductive interface member covering the temperature sensing device. The thermally conductive interface member engages at least one of the battery cells, and the temperature monitoring assembly monitors a temperature of that at least one battery cell.

20 Claims, 7 Drawing Sheets

(51) Int. Cl.
*H01M 10/42* (2006.01)
*H01M 2/10* (2006.01)
*H01M 2/20* (2006.01)
*H01M 2/30* (2006.01)

(52) U.S. Cl.
CPC ........... *H01M 2/206* (2013.01); *H01M 2/305* (2013.01); *H01M 10/4257* (2013.01); *H01M 10/482* (2013.01); *H01M 2220/20* (2013.01)

BATTERY MODULE WITH A TEMPERATURE MONITORING ASSEMBLY

CROSS-REFERENCE TO RELATED APPLICATIONS

This application claims priority to U.S. Provisional Application No. 62/184,636, filed 25 Jun. 2015, which is incorporated by reference in its entirety.

BACKGROUND OF THE INVENTION

The subject matter herein relates generally to battery modules.

Battery modules, such as those for electric vehicles or hybrid vehicles, typically includes a plurality of cells grouped together to form the battery modules. The battery modules are connected together with a cover assembly to form battery packs. Each of the cells includes positive and negative cell terminals that are electrically connected together via the cover assembly. Different types of battery modules are formed using different types of cells. For example, one type of battery modules are known as pouch type battery modules, another type of battery modules are known as prismatic battery modules, and a third type of battery modules are known as cylindrical battery modules. Prismatic battery modules use prismatic battery cells that are stacked together. The positive and negative cell terminals are connected using bus bars.

Known battery packs typically include electrical components that are configured to monitor operating parameters of the battery cells of the battery modules, such as voltage, pressure, and temperature associated with the cells. For example, some battery packs include temperature monitoring systems that include features that are molded into a cover housing. The molded features house electrical and mechanical components of the temperature monitoring system, such as a temperature sensing device and a coil spring that biases the sensing device towards the battery cell(s). Since the molded features are molded into the cover housing, the temperature monitoring system can only monitor temperatures where the molded features are located. Thus, there are a limited number of available locations to monitor the temperature within the respective battery module. In addition, known temperature monitoring systems are relatively bulky and consume a significant amount of available space within the battery module, providing less room for other electrical systems. Furthermore, some known temperature monitoring systems include round cables that are used to convey electrical signals to and from the temperature sensing device. The round cables risk damage due to pinching, rubbing, and other contact forces within the battery modules.

A need remains for a temperature monitoring system that is selectively positionable at various locations within a battery module. A need remains for a temperature monitoring system that is low profile and reduces the risk of damage to an associated electrical cable.

BRIEF DESCRIPTION OF THE INVENTION

In one embodiment, a battery module is provided that includes a plurality of battery cells and a cover assembly. The battery cells are arranged side-by-side in a stacked configuration. The battery cells have positive and negative cell terminals. The cover assembly extends across and is coupled to the battery cells. The cover assembly includes a housing, bus bars, and a temperature monitoring assembly. The bus bars are held by the housing and engage corresponding positive and negative cell terminals of the battery cells to electrically connect adjacent battery cells. The temperature monitoring assembly is mounted to and extends along a mounting surface of the cover assembly that faces the battery cells. The temperature monitoring assembly includes an electrical cable, a temperature sensing device mounted to and electrically connected to the electrical cable, and a thermally conductive interface member covering the temperature sensing device. The thermally conductive interface member engages at least one of the battery cells. The temperature monitoring assembly monitors a temperature of the at least one battery cell that the thermally conductive interface member engages.

Optionally, the temperature monitoring assembly also includes a biasing member secured to the electrical cable. The biasing member engages the mounting surface of the cover assembly. The biasing member is at least one of compressible or deflectable to bias the thermally conductive interface member of the temperature monitoring assembly into sustained engagement with the at least one battery cell that the thermally conductive interface member engages. Optionally, the temperature monitoring assembly is mounted to the mounting surface of the cover assembly via an adhesive layer on the temperature monitoring assembly.

In another embodiment, a cover assembly for a battery module that includes battery cells arranged side-by-side in a stacked configuration is provided. The cover assembly is configured to be coupled to the battery cells. The cover assembly includes a housing, a plurality of bus bars held by the housing, and a temperature monitoring assembly. The housing is configured to extend a length across the battery cells. The bus bars are configured to engage corresponding positive and negative cell terminals of the battery cells to electrically connect adjacent battery cells. The temperature monitoring assembly is mounted to a mounting surface of the cover assembly that faces the battery cells. The temperature monitoring assembly includes an electrical cable, a temperature sensing device mounted to and electrically connected to the electrical cable, and a thermally conductive interface member covering the temperature sensing device. The thermally conductive interface member engages at least one of the battery cells. The temperature monitoring assembly monitors a temperature of the at least one battery cell that the thermally conductive interface member engages. The temperature monitoring assembly further includes an adhesive layer that bonds to the mounting surface of the cover assembly to mount the temperature monitoring assembly to the cover assembly.

DETAILED DESCRIPTION OF THE INVENTION

Figure 1:
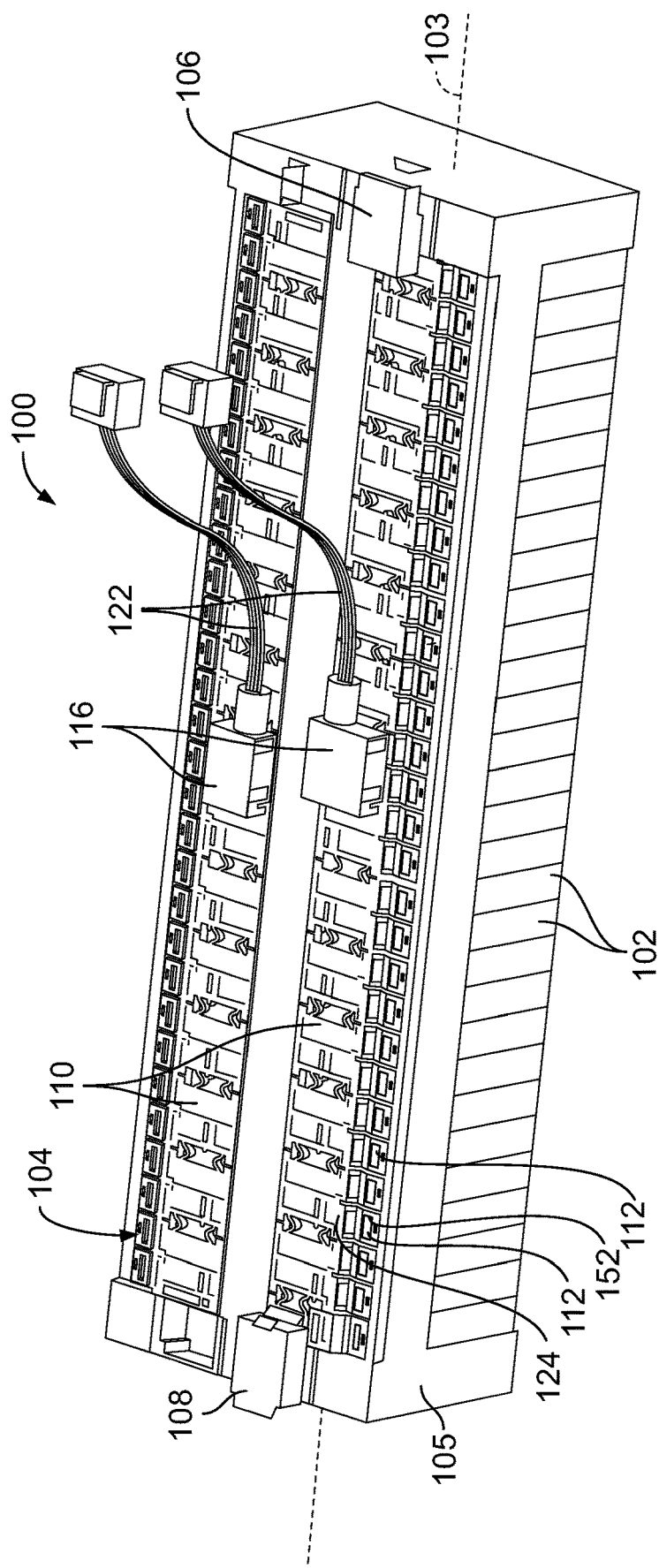
FIG. 1 is a top perspective view of a battery module formed in accordance with an embodiment.

FIG. 1 is a top perspective view of a battery module 100 formed in accordance with an embodiment. The battery module 100 may be used as part of a battery system in a vehicle, such as an electric vehicle or a hybrid electrical vehicle. The battery module 100 may be used in other applications in alternative embodiments.

The battery module 100 includes a plurality of battery cells 102. The battery cells 102 are arranged side-by-side in a stacked configuration along a stack axis 103. The battery cells 102 in an embodiment are prismatic battery cells, but may be other types of battery cells in other embodiments. Optionally, the battery module 100 may include a case 105 that holds the battery cells 102 in the stacked configuration. A cover assembly 104 is provided that extends across respective tops of the battery cells 102. The cover assembly 104 is coupled to the battery cells 102.

The battery module 100 includes a positive battery terminal 106 and a negative battery terminal 108. The battery terminals 106, 108 are configured to be coupled to an external power cable or alternatively may be bussed to battery terminals of another battery module that is similar to the battery module 100. Each of the battery cells 102 of the battery module 100 includes a positive cell terminal (not shown) and a negative cell terminal (not shown). The cell terminals of each battery cell 102 are generally aligned with corresponding cell terminals of adjacent battery cells 102 near outer edges of the battery cells 102. In an embodiment, the battery cells 102 are arranged such that the positive cell terminal of one battery cell 102 is located between negative cell terminals of two adjacent battery cells 102, and the negative cell terminal of the one battery cell 102 is located between positive cell terminals of the two adjacent battery cells 102. Thus, the cell terminals may have an alternating positive-negative-positive-negative pattern along a length of the stacked battery cells 102.

The cover assembly 104 includes a housing 110 that extends a length across the battery cells 102. For example, the housing 110 may be oriented to extend parallel to the stack axis 103. The cover assembly 104 further includes a plurality of bus bars 112 that are held by the housing 110. The bus bars 112 are shown in more detail in FIG. 2. The bus bars 112 are each configured to engage two adjacent battery cells 102 that are stacked next to each other in order to electrically connect the two battery cells 102. The bus bars 112 each provide an electrical current path between two adjacent battery cells 102. For example, each bus bar 112 engages and electrically connects to the positive cell terminal of one battery cell 102 and the negative cell terminal of an adjacent battery cell 102. The bus bars 112 allow electrical energy (for example, current and voltage) to propagate through and between plural battery cells 102 of the battery module 100 without being restricted to one battery cell 102. The bus bars 112 are disposed vertically between a top cover 124 of the housing 110 and the battery cells 102. As used herein, relative or spatial terms such as "top," "bottom," "front," "rear," "left," and "right" are only used to distinguish the referenced elements and do not necessarily require particular positions or orientations in the battery module 100 or in the surrounding environment of the battery module 100.

Optionally, the cover assembly 104 further includes at least one electrical connector 116 mounted on the top cover 124 of the housing 110. The electrical connectors 116 shown in FIG. 1 are electrically terminated to corresponding wire harnesses 122 at one end and to a sensor at another end. The sensor may be disposed between the top cover 124 of the housing 110 and the battery cells 102. The sensor is configured to monitor at least one operating parameter of the battery cells 102. For example, the sensor may be a temperature sensor, a voltage sensor, a pressure sensor, or the like. The wire harnesses 122 may be configured to provide an electrical signal path from the electrical connectors 116 towards a central controller (not shown). The central controller may be a computer, a processor, or another processing device that is used to analyze and monitor the operating parameters of the battery cells 102, such as temperature, pressure, voltage, and the like. The electrical connectors 116 and associated wire harnesses 122 may therefore convey electrical signals between the sensors within or on the cover assembly 104 and the central controller.

Figure 2:
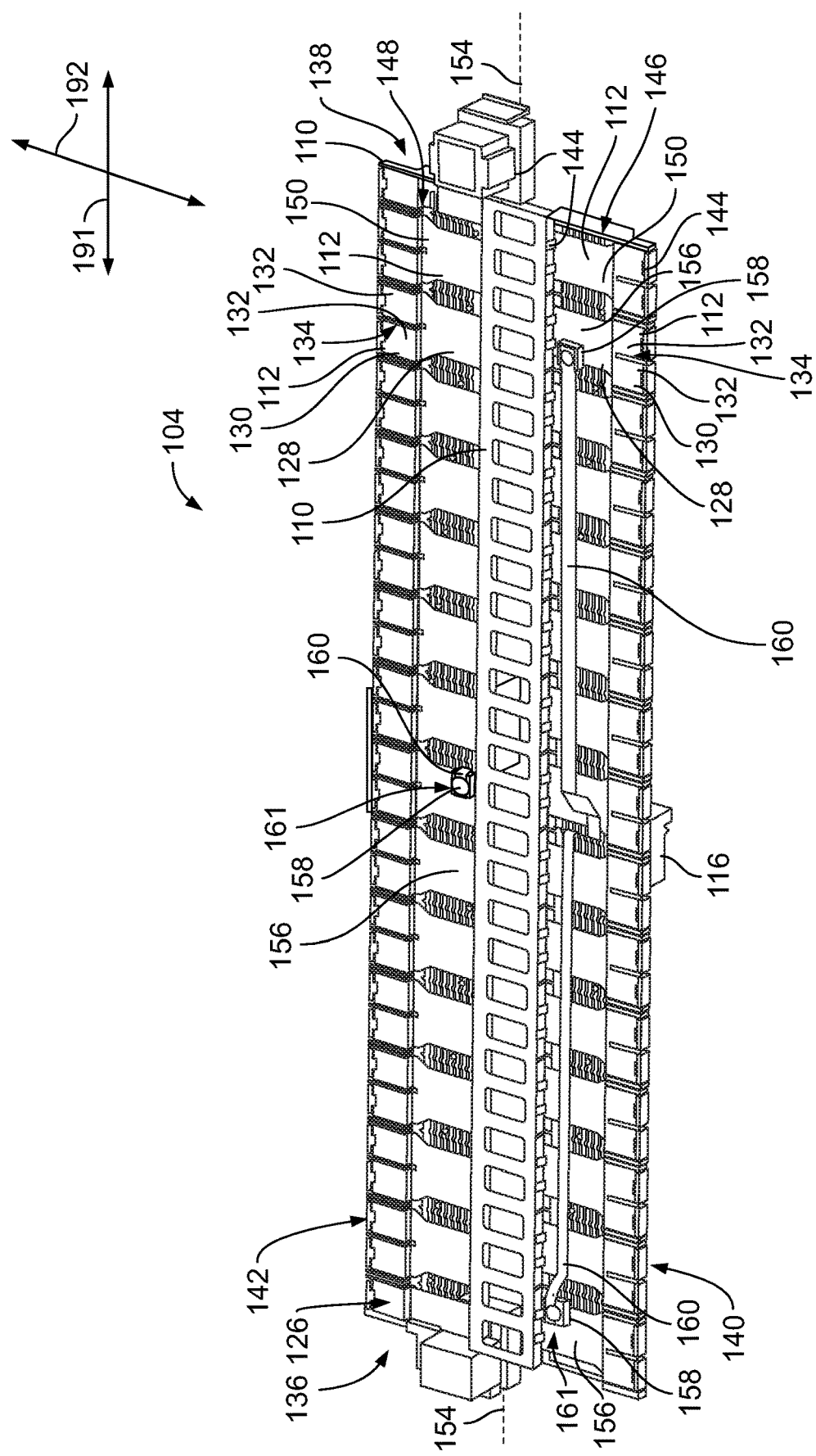
FIG. 2 is a bottom perspective view of a cover assembly of the battery module formed in accordance with an embodiment.

FIG. 2 is a bottom perspective view of the cover assembly 104 of the battery module 100 (shown in FIG. 1) formed in accordance with an embodiment. The visible bottom 126 of the cover assembly 104 is configured to extend across outer surfaces (for example, top surfaces) of the battery cells 102 (shown in FIG. 1). The cover assembly 104 extends a length along a longitudinal axis 191 between a first end 136 and a second end 138. The cover assembly 104 extends a width along a lateral axis 192 between a first side 140 and a second side 142. The longitudinal axis 191 is perpendicular to the lateral axis 192.

The housing 110 provides a frame that couples to the bus bars 112 and holds the bus bars 112 in place relative to the housing 110. For example, the housing 110 includes retention features 144, such as deflectable latches, interference barbs, and/or the like that engage the bus bars 112 and mechanically secure the bus bars 112 to the housing 110. The bus bars 112 are arranged in first and second parallel rows 146, 148 that extend along the longitudinal axis 191. The first and second rows 146, 148 are spaced apart from one another along the width of the cover assembly 104. For example, the first row 146 is located proximate to the first side 140 of the cover assembly 104, and the second row 148 is located proximate to the second side 142. The bus bars 112 each include a lower surface 150 and an opposite upper surface 152 (shown in FIG. 1). The lower surface 150 is configured to face the battery cells 102 (shown in FIG. 1). The upper surface 152 faces the top cover 124 (shown in FIG. 1) of the housing 110.

Each bus bar 112 includes a base portion 128 and a terminal portion 130 that extends from the base portion 128. Each bus bar 112 is oriented to extend generally along the lateral axis 192 with the base portion 128 disposed more proximate (than the terminal portion 130) to a central longitudinal axis 154 that bisects the width of the cover assembly 104. The terminal portions 130 of the bus bars 112 in the first row 146 extend from the corresponding base portions 128 to the first side 140 of the cover assembly 104. Similarly, the terminal portions 130 of the bus bars 112 in the second row 148 extend from the corresponding base portions 128 to the second side 142 of the cover assembly 104. The terminal portion 130 of each bus bar 112 defines two legs 132 that are separated from one another by a slot 134, such that the bus bar 112 has a fork shape. The terminal portion 130 is configured to engage the positive and negative cell terminals (not shown) of the battery cells 102 (shown in FIG. 1) to electrically connect the respective bus bar 112 to the battery cells 102. For example, one of the legs 132 of a corresponding bus bar 112 engages the positive cell terminal of a first battery cell 102 and the other leg 132 of the same bus bar 112 engages the negative cell terminal of a second battery cell 102 that is adjacent to the first battery cell 102. The bus bar 112 therefore provides an electrical current path between the adjacent first and second battery cells 102.

The cover assembly 104 also includes at least one temperature sensor, referred to herein as a temperature monitoring assembly 158. Three temperature monitoring assemblies 158 are shown in the illustrated embodiment. Each temperature monitoring assembly 158 is mounted to and extends along a mounting surface 156 of the cover assembly 104. The mounting surface 156 of the cover assembly 104 faces the battery cells 102 (shown in FIG. 1) when the cover assembly 104 is coupled to the battery cells 102. Each temperature monitoring assembly 158 is configured to measure a temperature of one or more battery cells 102 of the battery module 100 (shown in FIG. 1). As shown in FIG. 2, the temperature monitoring assemblies 158 may be spaced apart from one another along the length of the cover assembly 104 and/or along the width of the cover assembly 104. Thus, temperature measurements may be obtained at various spaced-apart locations within the battery module 100.

Each temperature monitoring assembly 158 includes an electrical cable 160 that extends from a mounting end 161 of the cable 160 to a connector end (not shown) that is electrically terminated to an electrical connector. The electrical connector may be one of the electrical connectors 116 disposed along the top cover 124 (shown in FIG. 1) of the housing 110. In an alternative embodiment, the connector end of the electrical cable 160 may extend remotely from the cover assembly 104 to an electrical connector that is not disposed along the top cover 124. The temperature monitoring assembly 158 may be coupled to the mounting surface 156 of the cover assembly 104 at the mounting end 161 of the cable 160. It is recognized, however, that the cable 160 may indirectly engage the mounting surface 156 via an intervening component of the temperature monitoring assembly 158. The electrical cable 160 of one or more of the temperature monitoring assemblies 158 may extend across multiple bus bars 112 (and across multiple battery cells 102) between the mounting end 161 and the connector end. The electrical cable 160 is configured to provide an electrical current path between the temperature sensing location, which may be at or at least proximate to the mounting end 161 of the cable 160, and the corresponding electrical connector 116. The electrical cable 160 therefore may define a portion of the electrical signal path between the respective temperature sensing location and the central controller (not shown).

Figure 3:
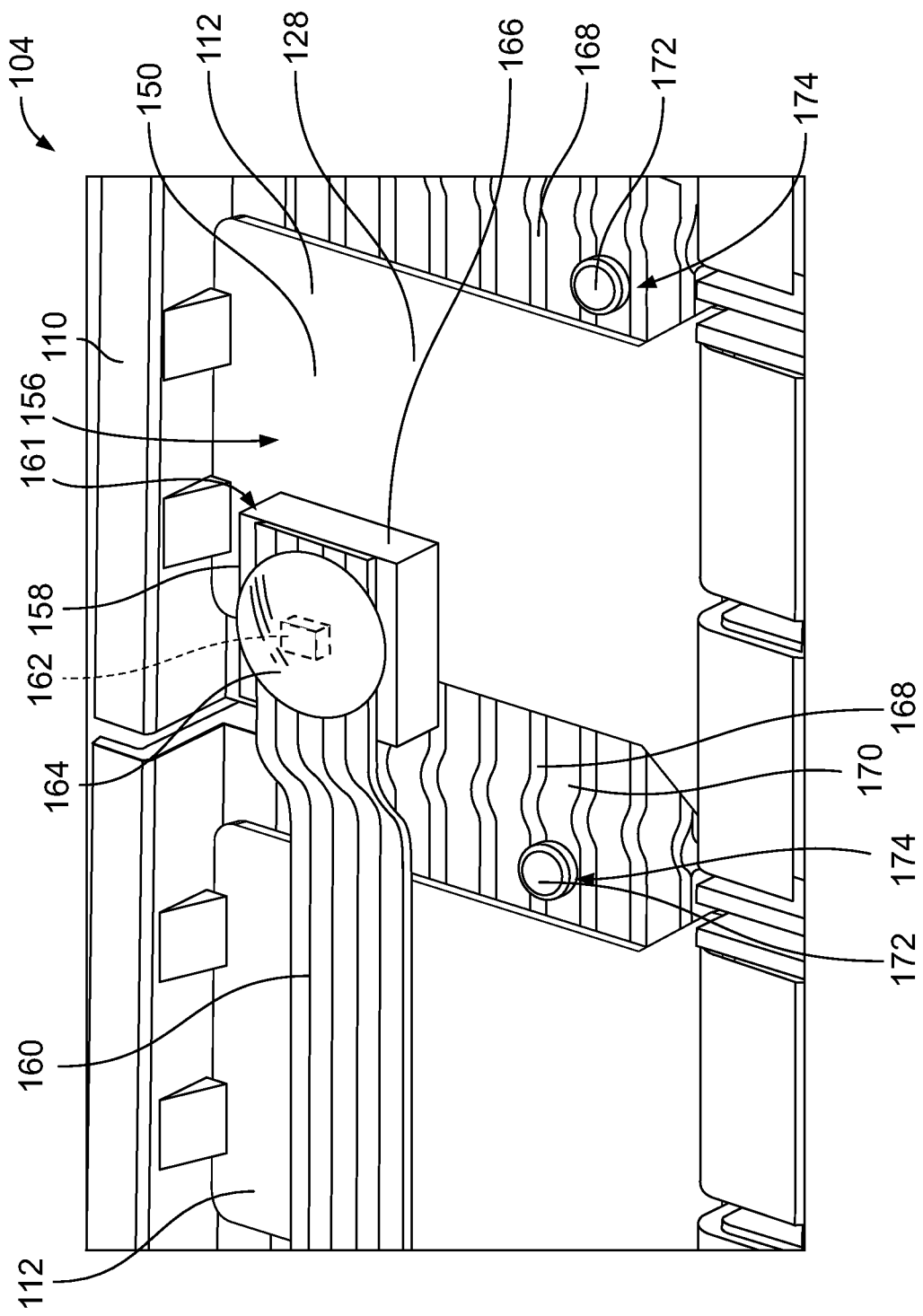
FIG. 3 is a close-up bottom perspective view of a portion of the cover assembly according to an embodiment.

FIG. 3 is a close-up bottom perspective view of a portion of the cover assembly 104 according to an embodiment. The portion of the cover assembly 104 shows bus bars 112 arranged along a common row, which may be the first row 146 or the second row 148 shown in FIG. 2. FIG. 3 also shows a temperature monitoring assembly 158 that is mounted to one of the bus bars 112A. For example, the temperature monitoring assembly 158 is mounted directly to the lower surface 150 of the bus bar 112A along the base portion 128. In the illustrated embodiment, therefore, the lower surfaces 150 of the bus bars 112 along the base portions 128 define the mounting surface 156 of the cover assembly 104 (to which the temperature monitoring assemblies 158 are mounted). In an embodiment, the temperature monitoring assembly 158 is mounted to the lower surface 150 of the bus bar 112A via an adhesive, but the temperature monitoring assembly 158 may be mounted via welding, soldering, or the like in other embodiments. The electrical cable 160 of the temperature monitoring assembly 158 extends across the bus bar 112B that is adjacent to the bus bar 112A.

In an embodiment, the temperature monitoring assembly 158 includes the electrical cable 160, a temperature sensing device 162, and a thermally conductive interface member 164. The temperature sensing device 162 is mounted to and electrically connected to the electrical cable 160. The temperature sensing device 162 may be mounted to the electrical cable 160 at (or proximate to) the mounting end 161 of the cable 160. The temperature sensing device 162 is an electrical component that is used to measure the temperature, such as a thermistor or a related electrical component.

The thermally conductive interface member 164 covers the temperature sensing device 162. For example, the temperature sensing device 162 is shown in phantom in the illustrated embodiment since the temperature sensing device 162 is covered by the thermally conductive interface member 164. In an embodiment, the thermally conductive interface member 164 is mounted directly to (such as applied on) the electrical cable 160 and fully envelops the temperature sensing device 162. The thermally conductive interface member 164 is configured to protect the temperature sensing device 162 from impact forces, contaminants, and the like, to preserve the functionality and working lifetime of the temperature sensing device 162. The thermally conductive interface member 164 in an embodiment is configured to engage at least one of the battery cells 102 (shown in FIG. 1). For example, when the cover assembly 104 is coupled to the battery cells 102 to form the battery module 100 (shown in FIG. 1), the temperature monitoring assembly 158 is positioned such that the thermally conductive interface member 164 engages in physical contact at least one of the battery cells 102 (as shown in more detail in FIG. 5). The thermally conductive interface member 164 is thermally conductive to allow heat transfer across the interface member 164 between the battery cell 102 and the temperature sensing device 162. The temperature monitoring assembly 158 is therefore configured to monitor the temperature of the at least one battery cell 102 that is engaged by the interface member 164.

In an embodiment, the temperature monitoring assembly 158 further includes a biasing member 166. The biasing member 166 is configured to bias the thermally conductive interface member 164 into sustained engagement with the at least one battery cell 102 (shown in FIG. 1) that the thermally conductive interface member 164 engages. For example, as described in more detail herein, the biasing member 166 may be compressible and/or deflectable, and such compression or deflection causes the biasing member 166 to provide a biasing force on the thermally conductive interface member 164 towards the battery cell(s) 102. Therefore, the thermally conductive interface member 164 may retain engagement with the battery cell(s) 102 even when experiencing forces due to vibrations, thermal expansion and/or contraction, uneven terrain being traversed by a vehicle on which the battery module 100 (shown in FIG. 1) is disposed, or the like.

Optionally, the cover assembly 104 may further include a voltage monitoring electrical cable 168 which operates as a voltage sensor. The voltage monitoring electrical cable 168 is electrically connected to plural bus bars 112 for monitoring voltages across the battery cells 102 (shown in FIG. 1) engaged by the bus bars 112. For example, the voltage monitoring electrical cable 168 extends across the bus bars 112. The voltage monitoring electrical cable 168 includes multiple electrical conductors 170, and each conductor 170 engages and electrically connects to a different one of the bus bars 112. In the illustrated embodiment, the voltage monitoring electrical cable 168 extends along the base portions 128 of the bus bars 112 between the upper surface 152 (shown in FIG. 1) of the bus bars 112 and the top cover 124 (FIG. 1) of the housing 110. Thus, the voltage monitoring electrical cable 168 is disposed along the opposite side of the bus bars 112 relative to the temperature monitoring assembly 158. In an alternative embodiment, the voltage monitoring electrical cable 168 may extend along and engage the lower surface 150 of the bus bars 112, such that the voltage monitoring electrical cable 168 and the temperature monitoring assembly 158 are disposed along a common side of the bus bars 112. In the illustrated embodiment, the voltage monitoring electrical cable 168 may be mechanically secured to the housing 110 via posts 172 that extend through corresponding openings 174 in the cable 168.

Figure 4:
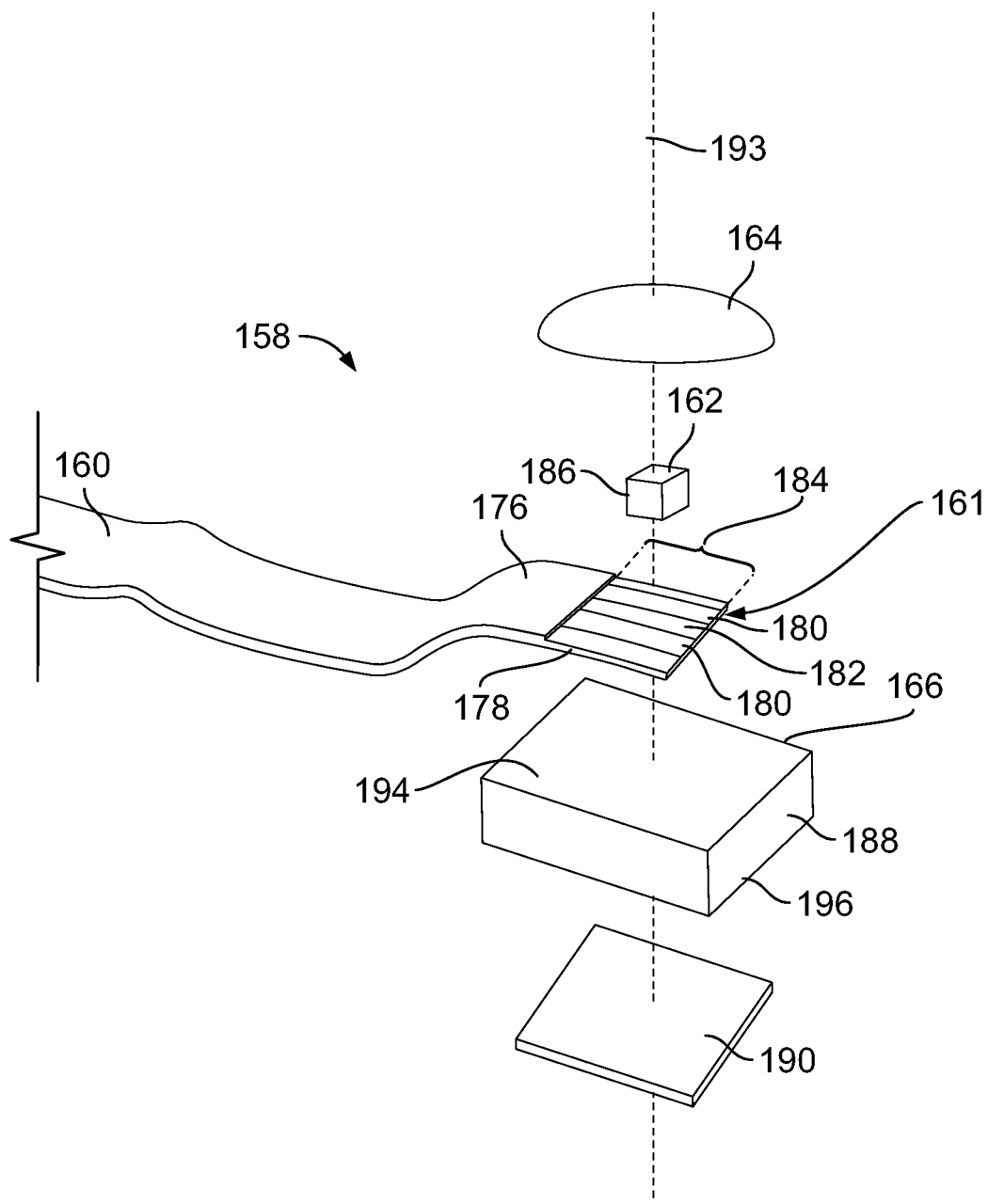
FIG. 4 is an exploded perspective view of a temperature monitoring assembly according to an embodiment.

FIG. 4 is an exploded perspective view of a temperature monitoring assembly 158 according to an embodiment. The components of the temperature monitoring assembly 158 are spaced apart along a vertical axis 193. In an embodiment, the electrical cable 160 is flat and includes a first side 176 and an opposing second side 178. For example, the electrical cable 160 may be a flexible flat cable that has at least two electrical conductors 180 arranged side-by-side across a width of the cable 160. The electrical conductors 180 may be planar strips of metal. The electrical cable 160 further includes a dielectric insulator 182 that surrounds the conductors 180 and extends between the conductors 180 to electrically isolate the conductors 180 from one another. The dielectric insulator 182 may be formed of an electrically insulative polymer material. Optionally, the dielectric insulator 182 may be molded or extruded around the conductors 180 to form the dielectric insulator 182. In another embodiment, the electrical cable 160 may be a flexible printed circuit board having at least two electrical conductors arranged side-by-side across a width of the cable 160. The electrical conductors may be electrical traces held by a dielectric substrate. In yet another embodiment, the electrical cable 160 may be a round wire including at least one conductor surrounded by at least a dielectric layer.

The temperature sensing device 162 may be a thermistor, a resistance temperature detector, or another electrical temperature-measuring component. In the illustrated embodiment, the temperature sensing device 162 includes a box-shaped body 186, but the temperature sensing device 162 may have other shapes in other embodiments.

The temperature sensing device 162 is mounted to the first side 176 of the electrical cable 160. For example, the electrical cable 160 defines exposed segments 184 of the conductors 180 that are exposed through the dielectric insulator 182. The temperature sensing device 162 may be surface mounted to the exposed segments 184 of at least some of the electrical conductors 180 to electrically connect the temperature sensing device 162 to the electrical cable 160. For example, the temperature sensing device 162 may include electrical contacts (not shown) that are soldered or otherwise secured to at least one of the conductors 180 of the cable 160. Optionally, a portion of the dielectric insulator 182 is removed after forming the electrical cable 160 to expose the exposed segments 184 of the conductors 180 to an external environment, such as via laser-cutting the dielectric insulator 182. Alternatively, the exposed segments 184 may be formed concurrently with the formation of the electrical cable 160. The exposed segments 184 in the illustrated embodiment extend to the mounting end 161 of the electrical cable 160. In an alternative embodiment, however, the exposed segments 184 may be spaced apart from the mounting end 161. The electrical conductors 180 may be stamped out between the location where the temperature sensing device 162 is electrically connected to the conductors 180 and the mounting end 161 of the cable 160, such that a portion of the conductors 180 is removed and the conductive circuit does not extend fully to the mounting end 161 of the cable 160. Although stamping is the described method for isolating the circuits, portions of the conductors 180 may be removed to isolate the circuits using other processes, such as cutting.

The thermally conductive interface member 164 is applied to the first side 176 of the electrical cable 160 to cover and surround the temperature sensing device 162. The interface member 164 is thermally conductive, such that the interface member 164 readily transfers heat. In an embodiment, the interface member 164 is electrically insulative, such that the interface member 164 does not readily transfer electrical energy (for example, current). Thus, the interface member 164 may be applied to the exposed segments 184 of the electrical conductors 180 without interfering with the electrical signal conduction between the electrical conductors 180 and the temperature sensing device 162. In an embodiment, the thermally conductive interface member 164 is formed of a thermally conductive epoxy material. The epoxy material is electrically insulative. The epoxy material may bond to the electrical cable 160 and/or the temperature sensing device 162 to mount the interface member 164.

Optionally, the thermally conductive interface member 164 may be applied to the first side 176 of the electrical cable 160 in a liquid or moldable solid (for example, viscous) phase. The thermally conductive interface member 164 covers the temperature sensing device 162 and flows around the temperature sensing device 162 to surround and fully envelop the temperature sensing device 162. Thus, no portion of the body 186 of the temperature sensing device 162 protrudes outward from the thermally conductive interface member 164. The thermally conductive interface member 164 may also fill the stamped out portion of the cable 160 that divides the conductors 180, which isolates the circuits. The thermally conductive interface member 164 may dry, cure, or otherwise transition to a rigid convex-shaped structure. Alternatively, the thermally conductive interface member 164 may be formed into a rigid dome shape prior to being applied and mounted to the electrical cable 160 to cover the temperature sensing device 162, instead of being applied in a liquid or viscous phase. The dome-shaped interface member 164 may define a cavity (not shown) that receives the temperature sensing device 162 therein.

In an embodiment, the biasing member 166 is secured to the second side 178 of the electrical cable 160. In the illustrated embodiment, the biasing member 166 is a compressible pad 188. The pad 188 has a rectangular box or cuboid shape, but the pad 188 may define other shapes in other embodiments. The pad 188 has a thickness that extends between an inner side 194 and an outer side 196 of the pad 188. The inner side 194 of the pad 188 engages the second side 178 of the electrical cable 160. The biasing member 166 may be secured to the electrical cable 160 via an adhesive, such as a tape, a gel, or a paste. Alternatively, the biasing member 166 may be mechanically secured to the cable 160 via a pin, a screw, or another fastener. The biasing member 166 may be formed, at least partially, of a microcellular plastic foam material. The foam material allows the biasing member 166 to at least partially compress in response to an impact force on the biasing member 166, and to exert an opposing biasing force in response. For example, when the temperature monitoring assembly 158 is mounted to the cover assembly 104 and engages the battery cell 102, the biasing member is elastically deformed between the electrical cable 160 and the mounting surface 156 of the cover assembly 104. When the impact force is removed, the biasing member 166 is configured to resiliently return towards an original position shape. The original shape is the shape of the biasing member 166 prior to the impact force being exerted on the biasing member 166. In one or more alternative embodiments, instead of a compressible pad 188, the biasing member 166 may be a deflectable beam, a compressible coil spring, or the like.

The temperature monitoring assembly 158 in an embodiment further includes an adhesive layer 190. The adhesive layer 190 is configured to bond to the mounting surface 156 (shown in FIG. 3) of the cover assembly 104 (FIG. 3) to mount the temperature monitoring assembly 158 to the cover assembly 104. The adhesive layer 190 may have the form of a tape, a paste, a gel, or the like. The adhesive properties of the adhesive layer 190 may be temperature or pressure activated. The adhesive layer 190 may be formed of one or more adhesive epoxy resin materials.

In the illustrated embodiment, the adhesive layer 190 is configured to engage and bond to the outer side 196 of the biasing member 166. The adhesive layer 190 may adhere to both the biasing member 166 and the mounting surface 156 of the cover assembly 104 to mount the temperature monitoring assembly 158 to the cover assembly 104. The biasing member 166 may be configured to indirectly engage the mounting surface 156 of the cover assembly 104 via the intervening adhesive layer 190. Although the adhesive layer 190 is shown in FIG. 4 as a separate component than the biasing member 166, it is recognized that the adhesive layer 190 optionally may be applied to the biasing member 166 without existing as a discrete layer separate from the biasing member 166. For example, the biasing member 166 may include the adhesive layer 190 on the outer side 196 for mounting the temperature monitoring assembly 158 to the cover assembly 104, and the biasing member 166 may also include another adhesive layer (not shown) on the inner side 194 for securing the electrical cable 160 to the biasing member 166. In an alternative embodiment in which the temperature monitoring assembly 158 does not include the biasing member 166, the adhesive layer 190 may be applied directly to the second side 178 of the electrical cable 160.

In an embodiment, the adhesive layer 190 allows the temperature monitoring assembly 158 to be mounted at one of various available locations along the mounting surface 156 of the cover assembly 104. For example, the location of the temperature monitoring assembly 158 is not limited to certain mounting locations defined in the housing 110 (shown in FIG. 3) of the cover assembly. Optionally, the temperature monitoring assembly 158 may be repositionable along the mounting surface 156 to change the temperature monitoring location, with or without replacing the adhesive layer 190.

Figure 5:
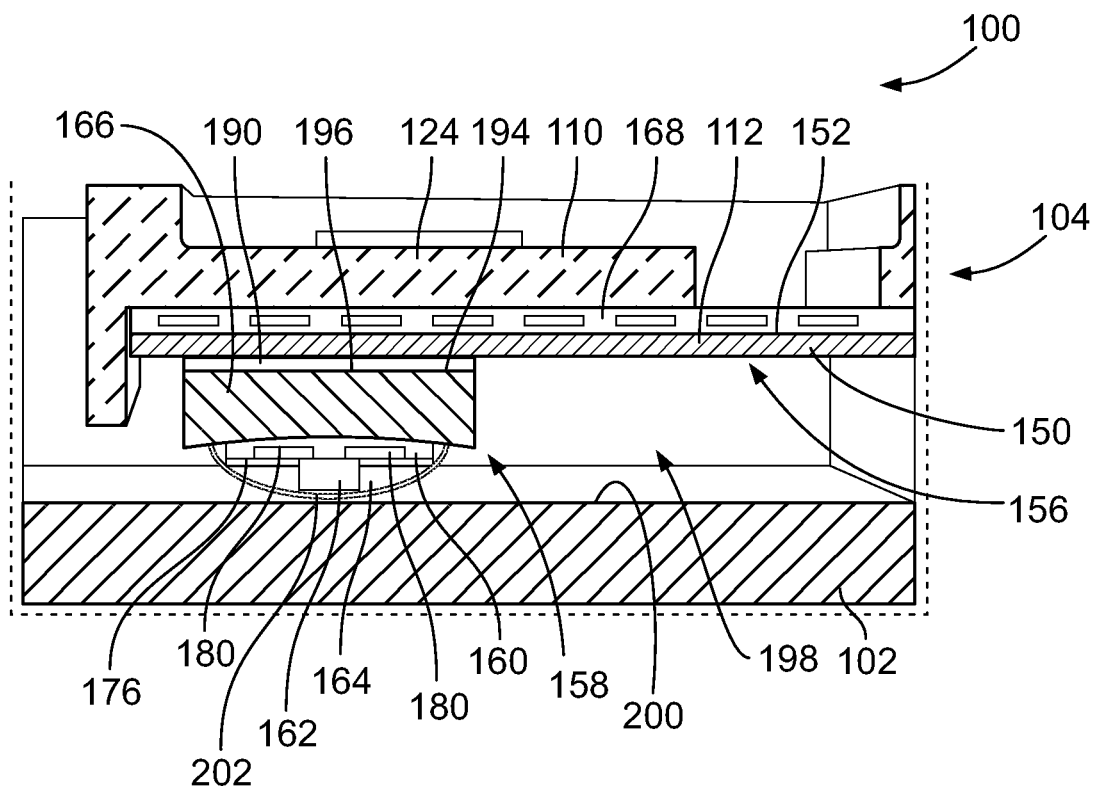
FIG. 5 is a cross-sectional view of a portion of the battery module according to an embodiment.

FIG. 5 is a cross-sectional view of a portion of the battery module 100 according to an embodiment. The illustrated portion of the battery module 100 includes a temperature monitoring assembly 158 mounted to the mounting surface 156 of the cover assembly 104. More specifically, the temperature monitoring assembly 158 is mounted directly to the lower surface 150 of a bus bar 112, which defines the mounting surface 156 of the cover assembly 104. A voltage monitoring electrical cable 168 is disposed along the upper surface 152 of the bus bar 112 between the bus bar 112 and the top cover 124 of the housing 110.

The temperature monitoring assembly 158 is mounted to the bus bar 112 via the adhesive layer 190 along the outer side 196 of the biasing member 166. The electrical cable 160 is secured to the inner side 194 of the biasing member 166. The temperature sensing device 162 is surface mounted and electrically connected to the conductors 180 of the electrical cable 160. The temperature sensing device 162 is covered by the thermally conductive interface member 164. The thermally conductive interface member 164 fully envelops the temperature sensing device 162. The interface member 164 is applied to the electrical cable 160, and, as shown in the illustrated embodiment, a portion of the interface member 164 may engage the inner side 194 of the biasing member 166.

The battery module 100 defines a channel 198 between the cover assembly 104 and the battery cells 102. For example, the channel 198 has a height defined between the mounting surface 156 of the cover assembly 104 and an outer surface 200 of each of the battery cells 102. The outer surface 200 may be a top surface of the respective battery cell 102. The temperature monitoring assembly 158 is disposed within the channel 198. For example, the electrical cable 160 may extend through the channel 198 across multiple battery cells 102 between the mounting end 161 (shown in FIG. 2) of the cable 160 and the electrical connector 116 (shown in FIG. 1) to which the cable 160 terminates. The temperature monitoring assembly 158 spans the height of the channel 198, such that the temperature monitoring assembly 158 engages both the mounting surface 156 of the cover assembly 104 and the outer surface 200 of the battery cell(s) 102 that the temperature monitoring assembly 158 engages. In the illustrated embodiment, the thermally conductive interface member 164 of the temperature monitoring assembly 158 engages a single battery cell 102. The apex 202 of the interface member 164 engages in physical contact the outer surface 200 of the corresponding battery cell 102. The apex 202 is the portion of the interface member 164 farthest from the first side 176 of the electrical cable 160. The biasing member 166 is elastically deformed between the electrical cable 160 and the mounting surface 156 of the cover assembly 104. The biasing member 166 exerts a biasing force on the interface member 164 towards the battery cell 102 to sustain engagement between the interface member 164 and the battery cell 102.

Figure 7:
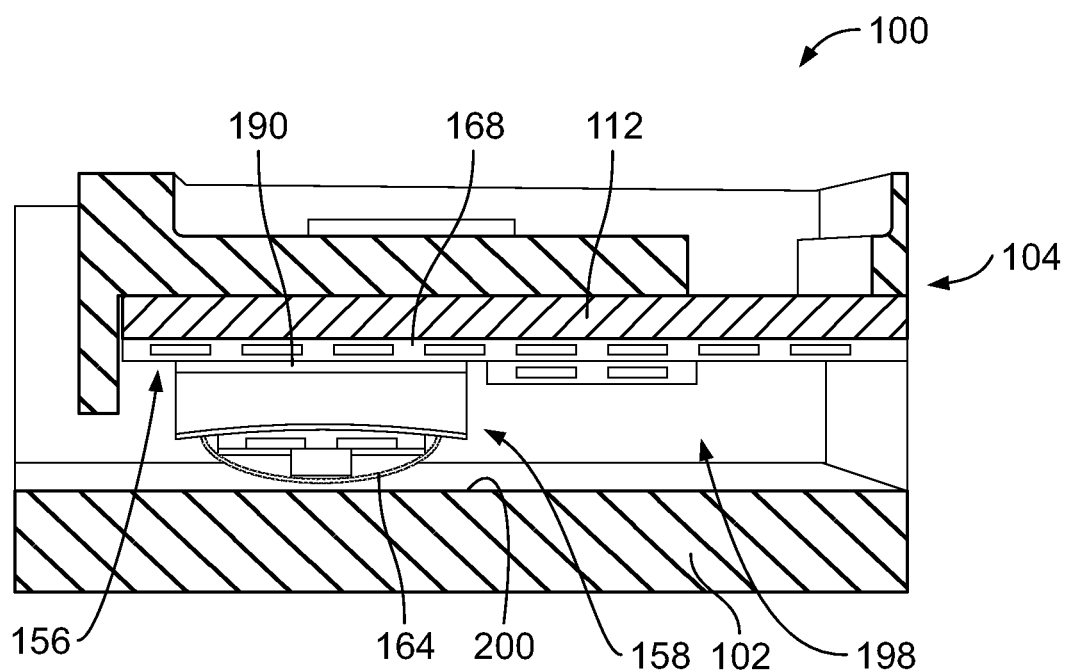
FIG. 7 is a cross-sectional view of a portion of the battery module according to the alternative embodiment shown in FIG. 6.
Figure 6:
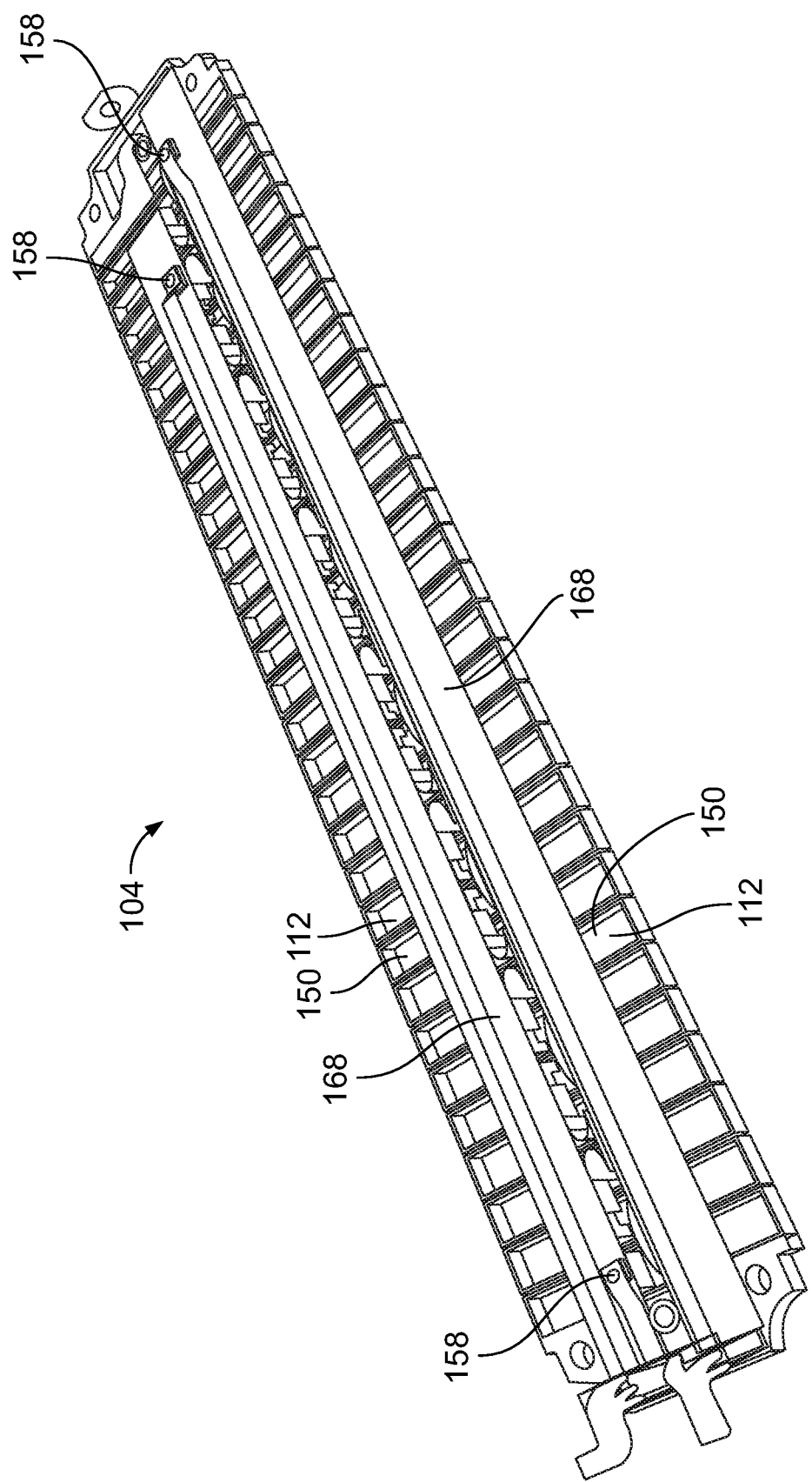
FIG. 6 is a bottom perspective view of the cover assembly of the battery module formed in accordance with an alternative embodiment.

FIG. 6 is a bottom perspective view of the cover assembly 104 of the battery module 100 (shown in FIG. 1) formed in accordance with an alternative embodiment. FIG. 7 is a cross-sectional view of a portion of the battery module 100 according to the alternative embodiment shown in FIG. 6. As shown in FIG. 6, the cover assembly 104 includes at least two voltage monitoring electrical cables 168 that extend along the length of the cover assembly 104. In the illustrated embodiment, the voltage monitoring electrical cables 168 are disposed along and engage the lower surfaces 150 of the corresponding bus bars 112 (instead of along the upper surfaces 152 as shown in FIG. 3). The cover assembly 104 further includes three temperature monitoring assemblies 158 that extend along the voltage monitoring electrical cables 168. The temperature monitoring assemblies 158 are each mounted directly to one of the voltage monitoring electrical cables 168, and not directly to the bus bars 112. As shown in FIG. 7, the illustrated temperature monitoring assembly 158 is mounted directly to the voltage monitoring electrical cable 168 via the adhesive layer 190. The voltage monitoring electrical cable 168 is disposed between the temperature monitoring assembly 158 and the bus bar 112. The voltage monitoring electrical cable 168 defines the mounting surface 156 of the cover assembly 104 in the illustrated embodiment. The temperature monitoring assembly 158 extends across the height of the channel 198 between the voltage monitoring electrical cable 168 and the battery cell 102, and the thermally conductive interface member 164 engages the outer surface 200 of the battery cell 102.

Figure 8:
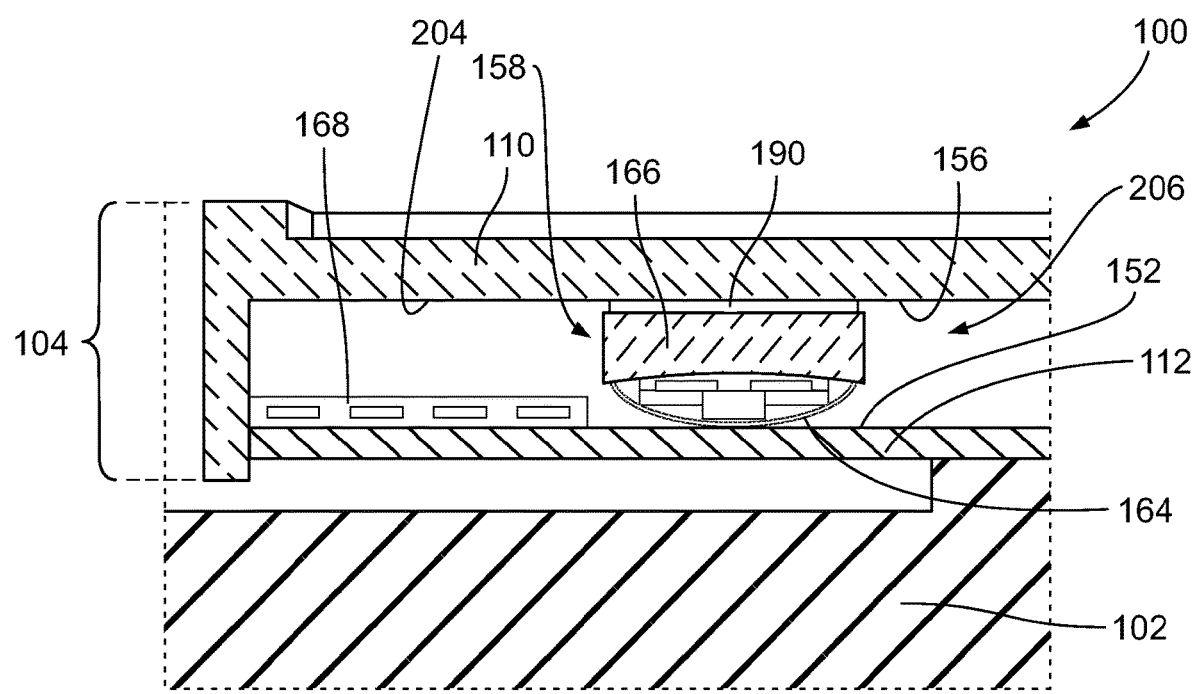
FIG. 8 is a cross-sectional view of a portion of the battery module according to an alternative embodiment.

FIG. 8 is a cross-sectional view of a portion of the battery module 100 according to an alternative embodiment. In the illustrated embodiment, the temperature monitoring assembly 158 is configured to monitor the temperature of one of the battery cells 102 indirectly via one of the bus bars 112 that is electrically connected to the battery cell 102. The bus bar 112 is both thermally and electrically conductive, and is in engagement with the battery cell 102, so heat from the battery cell 102 is transferred to the bus bar 112. Monitoring the temperature of the bus bar 112 may be used to indirectly monitor the temperature of the battery cell 102.

In the illustrated embodiment, the mounting surface 156 of the cover assembly 104 is defined by the housing 110. The biasing member 166 of the temperature monitoring assembly 158 is mounted to an interior surface 204 of the housing 110 that faces the bus bar 112. For example, a pocket 206 is defined between the mounting surface 156 and the upper surface 152 of the corresponding bus bar 112. The temperature monitoring assembly 158 is disposed within the pocket 206 such that the biasing member 166 engages the mounting surface 156 and the thermally conductive interface member 164 engages the upper surface 152 of the bus bar 112. The biasing member 166 exerts a biasing force on the interface member 164 towards the bus bar 112 to sustain engagement between the interface member 164 and the bus bar 112. By engaging the bus bar 112, the temperature monitoring assembly 158 is able to monitor the temperature of the bus bar 112, and indirectly monitor the temperature of the one or more battery cells 102 to which the bus bar 112 is electrically connected. The biasing member 166 may be mounted to the mounting surface 156 via the adhesive layer 190, which may be an element of the biasing member 166 or a discrete component separate from the biasing member 166.

In an alternative embodiment, the mounting surface 156 may be defined by another component of the cover assembly 104, such as a voltage monitoring electrical cable 168 that is electrically connected to the bus bar 112 for monitoring voltages across the battery cells. In the illustrated embodiment, however, the voltage monitoring electrical cable 168 is spaced apart laterally relative to the temperature monitoring assembly 158 along the bus bar 112.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A battery module comprising:
a plurality of battery cells arranged side-by-side in a stacked configuration, the battery cells having positive and negative cell terminals, and
a cover assembly extending across and being coupled to the battery cells, the cover assembly comprising:
a housing;
bus bars held by the housing and engaging corresponding positive and negative cell terminals of the battery cells to electrically connect adjacent battery cells; and
a temperature monitoring assembly mounted to and extending along a mounting surface of the cover assembly, the mounting surface facing the battery cells, the temperature monitoring assembly including an electrical cable, a temperature sensing device mounted to and electrically connected to the electrical cable, and a thermally conductive interface member covering the temperature sensing device, the thermally conductive interface member engaging in physical contact at least one of the battery cells, the temperature monitoring assembly monitoring a temperature of the at least one battery cell that the thermally conductive interface member engages,
wherein a channel is defined between the bus bars of the cover assembly and the battery cells and the temperature monitoring assembly is disposed within the channel between a first bus bar of the bus bars and the at least one battery cell that engages the thermally conductive interface member.

2. The battery module of claim 1, wherein the temperature monitoring assembly is mounted to the mounting surface of the cover assembly via an adhesive layer on the temperature monitoring assembly, the adhesive layer bonding to the mounting surface.

3. The battery module of claim 1, wherein the electrical cable is flat and includes opposing first and second sides, the temperature sensing device mounted on the first side of the electrical cable, the temperature monitoring assembly further including a biasing member that has an inner side and an outer side opposite the inner side, the inner side facing towards and secured to the second side of the electrical cable, the outer side facing towards and engaging the mounting surface of the cover assembly such that the biasing member is stacked between the electrical cable and the mounting surface, the biasing member being at least one of compressible or deflectable and configured to exert a biasing force on the electrical cable that forces the thermally conductive interface member of the temperature monitoring assembly towards the at least one battery cell that the thermally conductive interface member engages and into sustained engagement therewith.

4. The battery module of claim 3, wherein the biasing member is at least partially formed of a microcellular plastic foam material.

5. The battery module of claim 3, wherein the biasing member is a compressible pad.

6. The battery module of claim 1, wherein the electrical cable is at least one of a flexible flat cable or a flexible printed circuit board having at least two electrical conductors arranged side-by-side across a width of the electrical cable.

7. The battery module of claim 1, wherein the thermally conductive interface member is formed of a thermally conductive epoxy material.

8. The battery module of claim 1, wherein the electrical cable extends across multiple battery cells from a mounting end to an electrical connector.

9. The battery module of claim 1, wherein the temperature monitoring assembly is mounted directly to a voltage monitoring electrical cable that is stacked between the temperature monitoring assembly and a lower surface of the first bus bar, the voltage monitoring electrical cable electrically connected to the bus bars for monitoring voltages across the battery cells, the voltage monitoring electrical cable defining the mounting surface of the cover assembly.

10. The battery module of claim 1, wherein the bus bars include terminal portions and base portions, the terminal portions engaging the corresponding positive and negative cell terminals of the battery cells, wherein the temperature monitoring assembly is mounted directly to a lower surface of the first bus bar along the base portion thereof, the lower surface of the first bus bar defining the mounting surface of the cover assembly.

11. The battery module of claim 1, wherein the thermally conductive interface member is disposed on the electrical cable and fully envelops the temperature sensing device on the electrical cable.

12. A cover assembly for a battery module that includes plural battery cells arranged side-by-side in a stacked configuration, the cover assembly configured to be coupled to the battery cells, the cover assembly comprising:
    a housing configured to extend a length across the battery cells;
    a plurality of bus bars held by the housing, the bus bars configured to engage corresponding positive and negative cell terminals of the battery cells to electrically connect adjacent battery cells; and
    a temperature monitoring assembly mounted to a lower surface of one of the bus bars, the lower surface facing the battery cells when the cover assembly is coupled to the battery cells, the temperature monitoring assembly including an electrical cable, a temperature sensing device mounted to and electrically connected to the electrical cable, and a thermally conductive interface member covering the temperature sensing device, the thermally conductive interface member engaging in physical contact at least one of the battery cells, the temperature monitoring assembly monitoring a temperature of the at least one battery cell that the thermally conductive interface member engages, the temperature monitoring assembly further including an adhesive layer that bonds to the lower surface of the bus bar.

13. The cover assembly of claim 12, wherein the electrical cable is flat and includes opposing first and second sides, the temperature sensing device mounted on the first side of the electrical cable, the temperature monitoring assembly further including a biasing member that has an inner side and an outer side opposite the inner side, the inner side facing towards and secured to the second side of the electrical cable, the outer side being secured to the lower surface of the bus bar via the adhesive layer such that the biasing member is stacked between the electrical cable and the bus bar, the biasing member being at least one of compressible or deflectable and configured to exert a biasing force on the electrical cable that forces the thermally conductive interface member of the temperature monitoring assembly into sustained engagement with the at least one battery cell that the thermally conductive interface member engages.

14. The cover assembly of claim 13, wherein the biasing member is at least partially formed of a microcellular plastic foam material.

15. A cover assembly for a battery module that includes plural battery cells arranged side-by-side in a stacked configuration, the cover assembly configured to be coupled to the battery cells, the cover assembly comprising:
    a housing configured to extend a length across the battery cells;
    a plurality of bus bars held by the housing, the bus bars configured to engage corresponding positive and negative cell terminals of the battery cells to electrically connect adjacent battery cells; and
    a temperature monitoring assembly mounted to a lower surface of one of the bus bars, the lower surface facing the battery cells when the cover assembly is coupled to the battery cells, the temperature monitoring assembly configured to monitor a temperature of at least one of the battery cells, the temperature monitoring assembly comprising:
        a flat electrical cable that includes opposing first and second sides, the electrical cable having electrical conductors arranged side-by-side across a width of the electrical cable and a dielectric insulator that surrounds the electrical conductors and extends between the electrical conductors, wherein the electrical cable includes exposed segments of the electrical conductors that are exposed through the dielectric insulator along the first side;
        a temperature sensing device surface mounted to the first side of the electrical cable and electrically connected to the exposed segments of the electrical conductors;
        a thermally conductive interface member covering and fully enveloping the temperature sensing device that is mounted on the first side of the electrical cable such that a portion of the thermally conductive interface member engages in physical contact the first side of the electrical cable; and
        a biasing member having an inner side and an outer side opposite the inner side, the inner side facing towards and secured to the second side of the electrical cable, wherein the biasing member is discrete from the thermally conductive interface member, the outer side of the biasing member bonded to the lower surface of the bus bar via an adhesive layer such that the biasing member is stacked between the electrical cable and the bus bar, wherein the biasing member is at least one of compressible or deflectable and is configured to exert a biasing force on the electrical cable towards the battery cells.

16. The cover assembly of claim 15, wherein the thermally conductive interface member is configured to engage in physical contact at least one of the battery cells when the cover assembly is coupled to the battery cells to directly monitor a temperature of the at least one of the battery cells.

17. The cover assembly of claim 12, wherein the thermally conductive interface member is electrically insulative.

18. The cover assembly of claim 12, wherein the bus bars include terminal portions and base portions, the terminal portions engaging the corresponding positive and negative cell terminals of the battery cells, wherein the lower surface of the bus bar to which the temperature monitoring assembly is mounted is along the base portion of the bus bar.

19. The cover assembly of claim 15, wherein the bus bars include terminal portions and base portions, the terminal portions engaging the corresponding positive and negative cell terminals of the battery cells, wherein the lower surface of the bus bar to which the temperature monitoring assembly is mounted is along the base portion of the bus bar.

20. The cover assembly of claim 16, wherein temperature monitoring assembly is configured to be sandwiched between the lower surface of the bus bar and the at least one battery cell when the cover assembly is coupled to the battery cells such that the biasing member is one or more of compressed or deflected to exert the biasing force.

* * * * *